(12) United States Patent
Ruud

(10) Patent No.: US 11,978,156 B2
(45) Date of Patent: May 7, 2024

(54) GRAPHICS PROCESSING

(71) Applicant: Arm Limited, Cambridge (GB)

(72) Inventor: Ole Magnus Ruud, Oslo (NO)

(73) Assignee: Arm Limited, Cambridge (GB)

( * ) Notice: Subject to any disclaimer, the term of this patent is extended or adjusted under 35 U.S.C. 154(b) by 113 days.

(21) Appl. No.: 17/698,819

(22) Filed: Mar. 18, 2022

(65) Prior Publication Data

US 2023/0298264 A1  Sep. 21, 2023

(51) Int. Cl.
*G06T 15/80* (2011.01)
*G06T 1/20* (2006.01)

(52) U.S. Cl.
CPC .............. *G06T 15/80* (2013.01); *G06T 1/20* (2013.01)

(58) Field of Classification Search
CPC .......... G06T 11/40; G06T 1/20; G09G 5/393; G09G 5/39; G09G 5/395; G09G 2360/123; G09G 5/363
See application file for complete search history.

(56) References Cited

U.S. PATENT DOCUMENTS

| | | | | |
|---|---|---|---|---|
| 2017/0287101 A1* | 10/2017 | Flordal | ................... | G09G 5/393 |
| 2021/0065437 A1* | 3/2021 | Brkic | .................... | G06T 15/405 |
| 2023/0298264 A1* | 9/2023 | Ruud | ........................ | G06T 1/20 |
| | | | | 345/426 |

* cited by examiner

*Primary Examiner* — Todd Buttram
(74) *Attorney, Agent, or Firm* — Vierra Magen Marcus LLP

(57) ABSTRACT

In a tile-based graphics processor when rendering a tile of a render output, which sub-regions, of a plurality of sub-regions that the tile has been divided into for fragment tracking purposes, fragments generated by the rasterisation stage fall within is determined. Then, for at least one sub-region of the plurality of sub-regions that the tile has been divided into, the processing of fragments for the sub-region of the tile is tracked to determine when the processing of all fragments for the sub-region of the tile has been finished. The writing of rendered fragment data for the sub-region of the tile from the tile buffer to memory is controlled on the basis of the tracking of the processing of fragments for the sub-region of the tile.

21 Claims, 6 Drawing Sheets

GRAPHICS PROCESSING

BACKGROUND

The technology described herein relates to graphics processing, and in particular to tile based graphics processing.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Once primitives have been generated, they can be processed by the graphics processing system, in order to generate the desired graphics processing output (render target), such as a frame for display.

The processing of primitives in a graphics processing system is usually carried out by further dividing each primitive into discrete graphic entities or elements, usually referred to as "fragments", on which the actual graphics processing operations (such as rendering operations) are carried out. Each such fragment will represent and correspond to a given position in the primitive and, in effect, comprises a set of data such as colour and depth values for the position in question.

Each graphics fragment usually corresponds to a single pixel (picture element) in the final display (since as the pixels are the singularities in the final picture to be displayed, there will usually be a one-to-one mapping between the "fragments" the graphics processor operates on and the pixels in the display). However, it can be the case that there is not a direct correspondence between "fragments" and "pixels", for example where particular forms of post-processing such as down-scaling are carried out on the rendered image prior to displaying the final image.

Thus two aspects of graphics processing that are typically carried out are the "rasterising" of graphics "primitive" (polygon) position data to graphics fragment position data (i.e. determining the (x, y) positions of the graphics fragments to be used to represent each primitive in the scene to be displayed), and then "rendering" the "rasterised" fragments (i.e. colouring, shading, etc. the fragments), e.g. for displaying on a display screen.

Some graphics processing systems operate in a "tile based" manner, in which the (two dimensional) output array of the rendering process (the "render target") (e.g., and typically, the frame/image that will be displayed to display the scene being rendered) is sub-divided (partitioned) into a plurality of smaller regions, usually referred to as "tiles", for the rendering process. The tiles are each rendered separately. The rendered tiles are then recombined to provide the complete output array (frame) (render target), e.g. for display.

The tiles can therefore be thought of as regions of the render target area (output frame) that the rendering process operates on. In such arrangements, the render target area (output frame) is typically divided into regularly sized and shaped tiles (they are usually, e.g., squares or rectangles) but this is not essential.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.

In tile based graphics processing, the primitives to be processed for a given output (e.g. that make up a draw call currently being processed) are sorted into respective primitive lists (tile lists) that indicate, for the tiles that the graphics processing output (render target) has been divided into for processing purposes, which primitives are to be processed for each tile. There may in this regard be a primitive list for each tile individually, or primitive lists that encompass multiple tiles may also or instead be provided. A given primitive may be included in more than one primitive list, e.g. where the primitive falls in more than one tile. The graphics processing system and processing pipeline normally includes an appropriate tiler (tiling stage/circuit) that sorts the primitives into the respective primitive lists for this purpose.

The primitive lists are then used to determine which primitives should be rasterised and rendered when processing a given tile of the graphics processing output.

The primitive sorting (tiling) operation is normally carried out after the primitives for the render output have been "assembled" (i.e. after the primitives have been assembled and defined based on a set vertices for the render output) but before any rasterisation of the primitives.

When rasterising and rendering a given tile (region), the fragment data representative of the rendered tile is written to and stored in a data buffer ("tile buffer") for that tile while the fragments for the tile are being processed (rasterised and rendered). The data for a position in the tile may be changed/overwritten as successive fragments are processed, but any data for the tile that is generated during the rendering process need only be stored in the tile buffer until the rendering of the tile has been completed, at which point "write out" of the tile may be performed by writing the "final" data for the tile from the tile buffer to (main) memory. Once write out of the data for a tile has been completed, the tile buffer may then be used when processing another tile (region) to be rendered (and so on).

Utilising a tile buffer in this manner allows the reading and writing of the data for the tile to be carried out using "local" storage until the "final" data for the tile has been prepared. This allows the data for the tile to be read and written more efficiently while it is being prepared, compared to if the data for the tile was written directly to (main) memory when being generated.

Having relatively larger (and fewer) tiles can reduce the amount of processing that needs to be performed when performing the tiling process to sort the primitives into the primitive lists for the tiles. Furthermore, having large tiles can reduce the number of primitives that "overlap" multiple tiles (and therefore may reduce the number of primitives that need to be processed for multiple tiles). However, processing larger tiles requires larger capacity data ("tile") buffers and increases the time needed to write out a tile, which can delay how quickly the processing of another tile can be begun.

The Applicants believe that there remains scope for improvements to tile based graphics processing systems.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
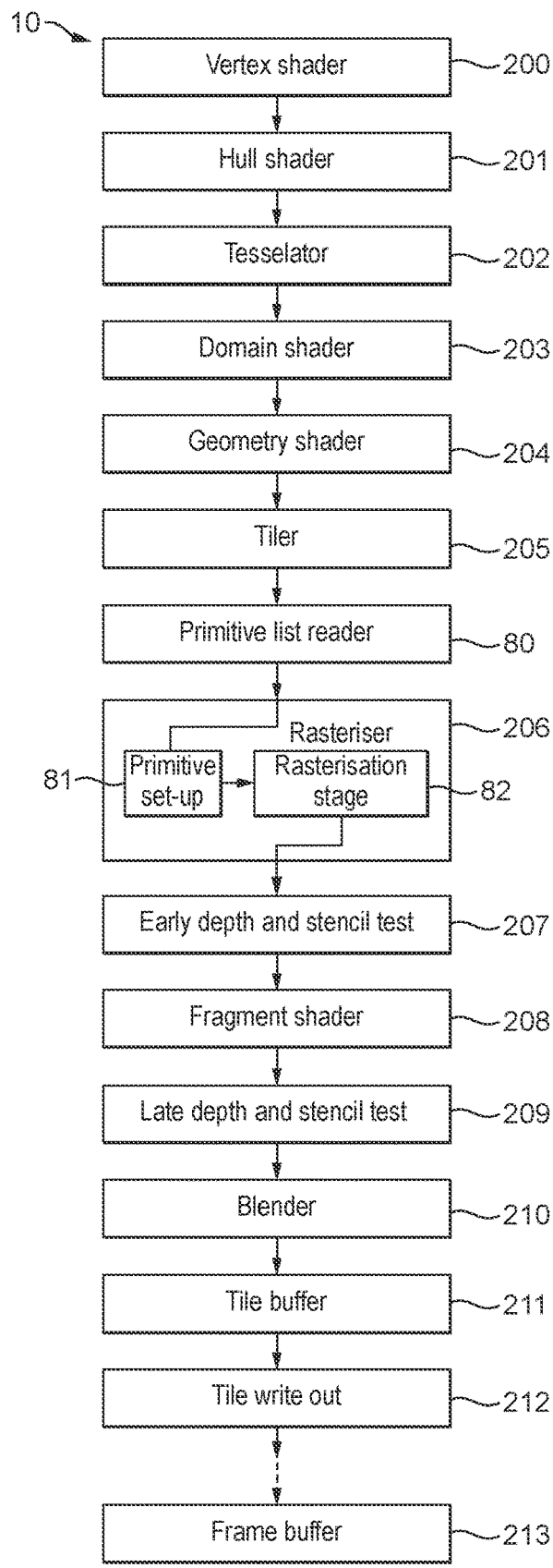
FIG. 1 illustrates schematically an exemplary graphics processing pipeline.

A first embodiment of the technology described herein comprises a method of operating a tile-based graphics processor that comprises a tile buffer, and executes a graphics processing pipeline that includes a plurality of processing stages including a rasterisation stage and a rendering stage, to generate and store in the tile buffer rendered fragment data for a tile of a render output being rendered, the method comprising:

when rendering a tile of a render output, the tile corresponding to a region of a plurality of regions that the render output has been divided into for rendering purposes:

the rasterisation stage rasterising primitives to be processed for the tile to generate graphics fragments for rendering for the tile; and the rendering stage rendering fragments for the tile generated by the rasterisation stage to generate rendered fragment data for the tile and storing the rendered fragment data for the tile in the tile buffer;

wherein the method further comprises the graphics processor:

determining which sub-regions, of a plurality of sub-regions that the tile has been divided into for fragment tracking purposes, fragments generated by the rasterisation stage fall within; and for at least one sub-region of the plurality of sub-regions that the tile has been divided into:

tracking the processing of fragments for the sub-region of the tile to determine when the processing of all fragments for the sub-region of the tile has been finished; and controlling the writing of a set of rendered fragment data for the sub-region of the tile from the tile buffer to memory on the basis of the tracking of the processing of fragments for the sub-region of the tile.

A second embodiment of the technology described herein comprises a tile-based graphics processor, comprising:

a tile buffer operable to store rendered fragment data for a tile of a render output being rendered;

a rasterisation circuit configured to rasterise primitives to be processed for a tile of a render output being generated to generate graphics fragments for rendering for the tile;

a rendering circuit configured to render fragments generated by the rasterisation circuit to generate rendered fragment data for the tile, and store the rendered fragment data for a tile in the tile buffer;

a write out circuit configured to write rendered fragment data from the tile buffer to memory;

a fragment sub-region determining circuit configured to determine which sub-region, of a plurality of sub-regions that a tile being processed has been divided into for fragment tracking purposes, a fragment generated by the rasterisation circuit falls within; and a fragment tracking circuit configured to, for at least one sub-region of a plurality of sub-regions that a tile being processed has been divided into for fragment tracking purposes:

track the processing of fragments for the sub-region of the tile to determine when the processing of all fragments for the sub-region of the tile has been finished; and control the writing of a set of rendered fragment data for the sub-region to memory by the write out circuit on the basis of the tracking of the processing of fragments for the sub-region of the tile.

The technology described herein relates to tile-based graphics processing. In the technology described herein, the processing of fragments that fall within one or more respective sub-regions of a tile being processed is tracked so as to determine when the processing of all fragments for a sub-region of the tile has finished. This tracking of the processing of fragments is then used to control the writing out of rendered fragment data for the sub-region(s) of the tile to memory.

The Applicants have recognised that by tracking the processing of fragments in one or more sub-regions of a tile, as in the technology described herein, and controlling the write out of rendered fragment data from the tile buffer for the one or more sub-regions based on that tracking, the write out of rendered fragment data for a tile from the tile buffer can be made more efficient, and can therefore provide an overall more efficient graphics processing operation (e.g. in terms of processing time, processing power, etc.).

In particular, and as will be discussed further below, the technology described herein can, in its embodiments at least, be used to allow write out of the rendered fragment data for a sub-region of a tile to be begun "early", before fragments that fall within other sub-region(s) of the tile have finished being processed, thereby allowing the write out of the tile to be completed more quickly (as compared to if the write out process is not begun until all of the fragments for all of the tile have been processed (i.e. until all of the rendered fragment data for the entire tile has been stored in the tile buffer)). This may also reduce "idle" time in-between the processing of different tiles, e.g. due to waiting for the write out of one tile to be completed so that the tile buffer can then be used for storing the data of another tile to be rendered.

The technology described herein relates to tile-based graphics processing i.e., in which the render output (such as, e.g., a frame to be displayed) is divided into plural rendering tiles for rendering purposes. Each rendering tile should, and in an embodiment does, span a (respective) region (area) of the render output. The tiles that the render output is divided into for rendering purposes in the technology described herein can be any suitable and desired such tiles. The size and shape of the rendering tiles may be dictated by the tile configuration that the graphics processor is configured to use and handle.

The rendering tiles are in an embodiment all the same size and shape (i.e. regularly sized and shaped tiles are in an embodiment used), although this is not essential. The tiles are in an embodiment rectangular, and in an embodiment square. The size and number of tiles can be selected as desired. Each tile may correspond to an array of contiguous sampling positions, for example each tile being 16×16 or 32×32 or 64×64 sampling positions in size. The render output may be divided into however many such tiles are required to span the render output, for the size and shape of the render output that is being used.

In the technology described herein, a rasterisation stage (rasterisation circuit) rasterises primitives to be processed for a tile of a render output.

The primitives that need to be processed for a tile are in an embodiment determined based on primitive lists that primitives for the render output are sorted into and that are indicative of which primitives should be rendered for respective regions of the render output being generated that the primitive lists relate to. In effect, respective regions of the render output can each be considered to have a bin (the primitive list) into which primitives that are found to (at least in part) fall within (i.e. intersect) the region can be placed (and, indeed, the process of sorting the primitives on a region-by-region basis in this manner may be referred to as "binning").

In the technology described herein, one or more, and in an embodiment plural, primitive lists can be, and are in an embodiment, prepared (with each primitive list identifying (listing) primitives which are to be processed for the respective region (area) of the render output that the primitive list in question relates to).

The regions for which primitive lists are prepared in an embodiment encompass (and correspond to) one or more rendering tiles of the render output. For example, primitive lists corresponding to individual rendering tiles may be prepared, and/or primitive lists corresponding to sets of plural rendering tiles may be prepared. In an embodiment a region for which a primitive list is prepared corresponds to one or more contiguous tiles (and thus spans an array of contiguous sampling positions). The regions for which primitive lists are prepared are in an embodiment rectangular (and more in an embodiment square).

In an embodiment, there are one or more sets of regions for which primitive lists can be prepared, with the regions in different sets of regions in an embodiment differing in size (area). In this case, the sets of regions are in an embodiment arranged in a hierarchy of sets of regions, wherein each set of regions corresponds to a layer in the hierarchy of sets of regions, and wherein regions for which primitive lists are prepared in progressively higher layers of the hierarchy are progressively larger.

In an embodiment, each region for which a primitive list can be prepared in a lowest layer of the hierarchy corresponds to a single tile of the render output, with regions in successively higher layers encompassing progressively more tiles, e.g. corresponding to 2×2 tiles, 4×4 tiles, 8×8 tiles, etc. respectively (or any other suitable and desired increasing region size).

To prepare the primitive lists, the primitives should be, and are in an embodiment, sorted (binned) into one or more primitive lists based on the region(s) of the render output which the primitives fall within.

Which region(s) a primitive falls within (and accordingly which primitive lists a primitive could be included in) should be, and is in an embodiment, determined based on the position of the primitive in the render output, and may use any suitable and desired technique, such as exact binning, or bounding box binning, or a combination of these techniques. In an embodiment bounding box binning is used when preparing the primitive lists.

The primitive lists which are prepared may be, and are in an embodiment, stored in a suitable storage (e.g. memory, e.g. a local memory, or in an embodiment a main memory of the graphics processing system which the graphics processor is part of), for later use.

The graphics processor and graphics processing pipeline should, and in an embodiment does, correspondingly comprise an appropriate tiler (tiling circuit/stage) that sorts the primitives into the respective primitive lists.

Once the tiling stage (tiling circuit) has completed the preparation of the primitive lists, then each tile can be processed (rasterised and rendered).

To do this, the primitive list or lists applying to a tile will be used (read) to determine the primitives to be processed for the tile. The primitives that are to be processed for a tile (that are listed in a primitive list applying to the tile) are then (in an embodiment) passed to the rasterisation stage (rasterisation circuit) for rasterising.

Thus, the graphics processor and graphics processing pipeline in an embodiment comprises a primitive list reader (primitive list reading circuit) that reads primitive lists and provides the primitives to be processed for a tile to the rasteriser/rasterisation stage.

The rasterisation stage/rasteriser operates to and is configured to rasterise the primitives into graphics fragments for processing. To do this, the rasterisation stage (rasterisation circuit) in an embodiment determines what sampling positions of the render output fall within the primitive (are covered by the primitive), and generates graphics fragments having appropriate positions (representing appropriate sampling positions) for rendering the primitive accordingly. Each graphics fragment may correspond to a single sampling position, or a set of plural sampling positions (e.g. 2×2 sampling positions), as desired.

In the technology described herein, a tile being processed is divided into a plurality of sub-regions ((sub-)areas) for fragment tracking purposes, and it is determined which such sub-region of the tile a fragment generated by the rasterisation falls within.

A (and in an embodiment each) sub-region that a tile is divided into for fragment tracking purposes in an embodiment corresponds to a respective set (area) of sampling positions for the tile. In an embodiment, a contiguous set of sampling positions is used for a (and each) sub-region (such that the sub-region corresponds to a contiguous region of the tile), but this is not essential and it would also be possible to use a set of discontiguous sampling positions for a sub-region(s), if desired. Each sub-region may, for example, be 8×8 or 16×16 or 32×32 sampling positions in size.

The sub-regions in an embodiment correspond to regions (areas) of the tile that are exclusive from one another (i.e. so that each sampling position with the tile will fall within a single sub-region only).

The sub-regions are in an embodiment all the same size and shape (configuration) (i.e. regularly-sized and shaped sub-regions are in an embodiment used). However, this is not essential and the sub-regions may have irregular sizes and/or shapes if desired. The sub-regions are in an embodiment rectangular, and in an embodiment square. The sub-regions in an embodiment have corresponding shapes of different sizes to the tile that the sub-regions relate to (e.g. square or rectangular sub-regions may be used for square or rectangular tiles) but this is also not essential.

The sub-regions are in an embodiment aligned with the positions of the fragments that the rasteriser will produce, such that any given fragment will always fall (entirely) within one sub-region only (every sampling position that a fragment represents will fall within the same sub-region) (and conversely such that no individual fragment will straddle (fall within) plural sub-regions). In other words, the edges of the sub-regions are in an embodiment appropriately aligned with the edges of fragments, such that any given sub-region will (only) contain an integer number of "whole" fragments.

The size and number of sub-regions for a tile can be selected as desired. There may be different numbers of sub-regions for different tiles (e.g. if the tiles are of different sizes) but in an embodiment each tile is divided into the same number of sub-regions (e.g. regardless of the size of the tile).

Using relatively higher numbers of sub-regions may increase the efficiency of the write out of rendered fragment data from the tile buffer to the memory. On the other hand, using relatively fewer numbers of sub-regions may reduce the processing resources needed to determine which sub-regions fragments fall into and track the processing of fragments to determine when all of the fragments that are determined to fall into a sub-region have finished being processed. The number of sub-regions is accordingly in an embodiment selected according to the requirements and capabilities of a particular graphics processor and graphics processing pipeline in question.

In an embodiment a (and in an embodiment each) tile is divided into between 2 and 8 sub-regions. In an embodiment, a (and in an embodiment each) tile is divided into four sub-regions, with each sub-region in an embodiment corresponding to a, in an embodiment equal sized, respective "quadrant" of the tile.

Which sub-region of a tile a fragment generated by the rasteriser/rasterisation circuit falls within can be determined in any suitable manner. This should be, and in an embodiment is, determined based on a position of the fragment in the render output.

Any suitable measure of a position of the fragment may be used for this purpose. In an embodiment, which sub-region a fragment falls within is determined based on which sub-region (the) one or more sampling positions that the fragment represents falls within (i.e. which respective set of sampling positions corresponding to a sub-region the sampling positions for the fragment fall within).

Thus, in an embodiment, which sub-region of a tile a fragment generated by the rasteriser/rasterisation circuit falls within is determined by comparing a position for the fragment (and in an embodiment a position of (the) one or more sampling positions that the fragment represents) with the positions of the sub-regions within the render output, to thereby determine which sub-region the fragment falls within.

The determination of which sub-regions of a tile fragments generated by the rasteriser/rasterisation circuit fall within can be performed at any suitable and desired stage and position in the sequence of graphics processing operations for the graphics processing pipeline, and by any suitable and desired element and component of the graphics processor. In an embodiment the sub-region determination is performed before rendering of the fragments. In an embodiment, the determination of which sub-regions fragments fall within is determined during or after rasterisation but before rendering.

In one embodiment, the determination of which sub-region the fragment falls within is determined as part of the rasterisation process, e.g., and in an embodiment, as and when fragments are generated by the rasteriser. Alternatively, the determination could be performed after rasterisation but before rendering.

Correspondingly, the sub-region determining circuit could be part of the rasteriser (rasterisation circuit), or it could be separate to the rasteriser/rasterisation circuit.

In an embodiment, an indication, such as, and in an embodiment, an index, of which sub-region a fragment has been determined to fall within is associated with a fragment, to allow the sub-region that a fragment has been determined to fall within to be (subsequently) identified. Thus, in an embodiment, the sub-region determination process comprises (and the sub-region determining circuit is correspondingly configured to) associating with a fragment an identifier, such as an index, to indicate which sub-region the fragment has been determined to fall within.

The rendering stage (rendering circuit) renders fragments generated by the rasterisation stage/rasterisation circuit to generate rendered fragment data, and stores the rendered fragment in the tile buffer.

The renderer/rendering process may comprise one or more fixed function rendering stages, such as texture mappers, blenders, fogging units, etc.

In an embodiment, the rendering stage (rendering circuit) performs one or more fragment shading operations on a fragment to derive rendered fragment data, such as colour values (e.g. red, green and blue (RGB) colour values) and an "alpha" (transparency) value, for shading each covered sampling position in the render output that that the fragment corresponds to. The fragment shading operations may involve any suitable processes for shading fragments, such as executing one or more fragment shading programs on the fragments, applying textures to the fragments, etc.

Thus, in an embodiment the renderer/rendering process comprises a fragment shader (a shader pipeline) (i.e. a programmable pipeline stage that is operable to and can be programmed to carry out fragment shading programs on fragments in order to render them). The renderer/rendering process may also or instead include (performing) ray-tracing, if desired.

The rendered fragment data generated by the rendering stage (rendering circuit) is written to the tile buffer (as one or more arrays of data corresponding to the array of sampling positions for the tile in question). In an embodiment, the tile buffer comprises a colour buffer for storing colour values and a depth buffer for storing depth values associated with fragments. When rendered fragment data for one or more sampling positions is generated by the rendering of a fragment, the data values of that rendered fragment data is written to the tile buffer at positions within the tile "data array" that correspond to the sampling positions that the rendered fragment data is for. The rendered fragment data for a tile can thereby be generated and stored in the tile-buffer piece by piece as fragments are processed.

As well as the actual rendering (fragment shading) operations to generate the rendered fragment data, fragments generated by the rasteriser may also be subjected to other operations, such as early and/or late culling operations (e.g. depth and/or stencil tests), blending operations, etc., as desired.

As discussed above, in the technology described herein, for at least one sub-region that a tile has been divided into for fragment tracking purposes, the processing of fragments for the sub-region is tracked to determine when the processing of all fragments for the sub-region for the tile has been finished.

It would be possible in this regard to only track the processing of fragments for a single sub-region of a tile, but in an embodiment, this is done for plural sub-regions of a tile, and in an embodiment for all the sub-regions of a tile.

The tracking of processing of fragments for a sub-region to determine when the processing of all fragments for the sub-region has been finished can be done in any suitable and desired manner.

In an embodiment, tracking the processing of fragments for a sub-region of a tile to determine when the processing of all fragments for the sub-region of the tile has been finished comprises:

determining when all of the fragments that (may potentially) fall within the sub-region have been generated for the tile (i.e. determining when there are no more fragments that could fall within the sub-region that could be generated for the tile), and tracking the processing of fragments for the sub-region to determine when all of the generated fragments that have been determined to fall within the sub-region have finished being processed.

Correspondingly the fragment tracking circuit is in an embodiment configured to determine that the processing of all fragments for a sub-region has been finished when (and in an embodiment in response to it being determined that):

all fragments that (may potentially) fall within the sub-region have been generated for the tile (there are no more fragments that could fall within the sub-region that could be generated for the tile); and all of the generated fragments that were (have been) determined to fall within the sub-region have finished being processed.

Determining whether all of the fragments that (may potentially) fall within a sub-region have been generated (i.e. that there are no more fragments that would fall within the sub-region that could be generated for the tile) is in an embodiment determined based on whether the rasterisation stage/rasterisation circuit has still to rasterise any primitives that could fall within the sub-region.

This could be determined for a (and the) sub-region(s) specifically, i.e. such that determining whether all of the fragments that (may potentially) fall within a sub-region have been generated comprises determining whether there are any primitives that cover sampling positions that fall within the sub-region (which may be determined by considering the positions of the primitives) that are yet to be rasterised.

However, in an embodiment, rather than considering whether there are, for example, any primitives for the tile still to be rasterised for sub-regions specifically, in an embodiment, it is simply determined whether there are any remaining primitives to be rasterised for the tile as a whole (i.e. whether all of the primitives to be rasterised for the tile have been rasterised) (irrespective of which sub-region they may fall within), in order to determine whether all of the fragments that (may potentially) fall within a sub-region have been generated.

Thus, in an embodiment, determining that all of the fragments (that may potentially) fall within a sub-region have been generated (determining that there are no more fragments that could fall within the sub-region that could be generated for the tile), comprises determining that all of the primitives for the tile have finished being processed (rasterised) by the rasterisation stage (rasterisation circuit) (that there are no more primitives for which rasterisation is not yet completed).

The fact that all of the primitives for a tile have finished being processed (rasterised) by the rasterisation stage (rasterisation circuit) can be determined in any suitable and desired manner.

This can, for example, be determined by counting primitives for a tile that are provided (e.g. by the primitive list reader) to the rasterisation stage (rasterisation circuit) and counting primitives for the tile that have finished being processed by the rasterisation stage/circuit.

In an embodiment, it is determined that all of the primitives for the tile have finished being processed (rasterised) by the rasterisation stage when, and on the basis that, all of the primitives from the primitive list(s) applying to the tile have been read from the primitive list(s) (i.e. there are no more primitives to be read from a primitive list applying to the tile) (the primitive lists applying to the tile have been exhausted), and provided to the rasterisation stage (rasterisation circuit) (and the rasterisation stage (rasterisation circuit) has finished processing all of the primitives that it has been provided with).

In an embodiment, an "end of tile" primitive, indicating the end of a tile can be and is included in the primitive lists, and used to identify when a tile has been finished. For example, and in an embodiment, the end of tile indicating primitive can be passed from the primitive list reader to the rasteriser and when the end of tile primitive reaches the output of the rasteriser, that can be taken as the end of the primitives for the tile in question.

Other arrangements, such as an indication that a new tile is to be started and/or that the current tile has been finished, thereby again indicating that there are no more primitives to be processed for the tile, could be also or instead be used, if desired.

It can be determined that all of the generated fragments that were determined to fall within a sub-region have finished being processed in any suitable and desired manner.

In an embodiment, this is done by tracking whether there are any fragments that have been determined to fall within the sub-region and that have not yet finished being processed (that are still undergoing processing and/or to be processed). In other words, it is in an embodiment tracked whether there are any currently "live" fragments for the sub-region or not.

Then, when it is determined that there are no more fragments that (may) potentially fall within the sub-region to be generated, and there are no fragments that were determined to fall within the sub-region that are still to be or being processed, it can accordingly be determined that the processing of all fragments for the sub-region of the tile has been finished.

Thus in an embodiment, tracking the processing of fragments for a sub-region of a tile to determine when the processing of all fragments for the sub-region of the tile has been finished comprises (and the fragment tracking circuit is correspondingly configured to):

determining when there are no more fragments that (may) potentially fall within the sub-region to be generated; and tracking the processing of fragments that have been determined to fall within the sub-region of the tile to determine when there are no fragments determined to fall within the sub-region for which the processing of the fragment has still to finish (to determine when there are no more fragments that have been determined to fall within the sub-region for which the processing has not yet been finished);

with it being determined that the processing of all fragments for the sub-region of the tile has been finished when there are no more fragments that (may) potentially fall with the sub-region to be generated, and when that is the case (and in an embodiment in response to that being the case), there are no fragments that have been determined to fall within the sub-region that are still to be or being processed (the processing of all fragments determined to fall within the sub-region of the tile has been finished).

Tracking whether the processing of all fragments determined to fall within a sub-region has finished (whether there are fragments still to be processed and/or being processed for a sub-region) in an embodiment comprises tracking whether fragments that have been determined to fall within the sub-region have finished their processing, in an embodiment by maintaining a count of the number of fragments that are currently "live" (to be processed or undergoing processing) for a sub-region, such that, e.g., and in an embodiment, when the "live" fragment count is determined to be zero, it can be determined that there are no fragments for the sub-region that are currently still waiting for their processing to be finished.

Thus, in an embodiment, tracking the processing of fragments for a sub-region of a tile to determine when the processing of all fragments for the sub-region of the tile has been finished comprises (and the fragment tracking circuit is correspondingly configured to):

tracking whether fragments that have been determined to fall within the sub-region have finished their processing; and when there are no more fragments that may potentially fall within the sub-region to be generated (which is in an embodiment determined as being (and in response to) when there are no more primitives to be rasterised in the tile in question), using the tracking of whether fragments that have been determined to fall within the sub-region have finished their processing to determine when the processing of all fragments determined to fall within the sub-region has finished.

In an embodiment, such tracking the processing of fragments determined to fall within a sub-region comprises counting fragments as they are determined to fall within the sub-region (e.g., and in an embodiment, as those fragments are generated), and counting fragments that have been determined to fall within the sub-region for which the processing has been finished, with the counting then being used to determine when there are no generated fragments that were determined to fall within the sub-region that have still to finish being processed.

It would be possible to use a plurality of counters for this (e.g. by comparing a counter value for generated fragments determined to fall within a sub-region, and a counter value for fragments determined to fall within a sub-region that have finished being processed), if desired.

However, in an embodiment, a (single) counter, that is, e.g., and in an embodiment, incremented when a fragment that is determined to fall within the sub-region is generated, and, e.g., and in an embodiment, decremented, when a fragment that was determined to fall within the sub-region has finished being processed, is used for a sub-region for this purpose. In this case, a count of zero, for example (or the counter returning to its initial value), can be taken to indicate that there are no "live" fragments for the sub-region undergoing processing or waiting to be processed.

As discussed above, in an embodiment fragments are assigned a sub-region indication, e.g. index, as part of the fragment sub-region determining process. These sub-region indications can accordingly be, and are in an embodiment, used when tracking and, e.g., counting, fragments that are to be and being processed for a sub-region, so as to facilitate the tracking of when and whether there are any fragments whose processing for a sub-region is still to be finished.

It will be appreciated in this regard, that the processing of a fragment (for a sub-region) may be finished (completed) when the fragment has been appropriately rendered, and rendered fragment data for the fragment has been stored to the tile buffer, but also in the event that the processing for the fragment is otherwise finished, for example because the fragment is culled (discarded) as a result of, e.g., a culling test, such as a depth test (without, e.g., rendered fragment data for the fragment actually ever being stored in the tile buffer).

Thus, in the present embodiments, the processing of a fragment is considered finished (and tracked as such) irrespective of the outcome of the processing or how the processing for the fragment has finished, and in particular, irrespective of whether the fragment was actually rendered to generate rendered fragment data that was stored in the tile buffer, or was culled (discarded) without writing any rendered fragment data for the fragment to the tile buffer. Thus, when counting the finishing of processing of fragments for a sub-region, both fragments that result in rendered fragment data being written to the tile buffer, and fragments that are culled (discarded) without that happening, are counted as fragments for which the processing has been finished.

Thus, in an embodiment, it is determined that the processing of all fragments for a sub-region has been finished when it is determined (and in response to it being determined) that all the fragments for the tile have been generated by the rasteriser (which is in an embodiment determined based on an indication that there are no more primitives for the tile to be rasterised), and thereafter (when the condition that all the fragments for the tile have been generated by the rasteriser has been met (is the case)), no more fragments that were determined to fall within the sub-region remain to have their processing finished (which is in an embodiment determined by keeping a count of those fragments for a sub-region that have been generated by the rasteriser and for which the processing is still to be finished).

As discussed above, while it would be possible to track the processing of fragments for a single sub-region of a tile only, in an embodiment this is done for plural sub-regions of a tile, and in an embodiment for each sub-region of the tile that the tile has been divided into for fragment tracking purposes. In the case where the processing of fragments is tracked for plural sub-regions, then the tracking of the processing of "live" fragments for each sub-region will be, and is in an embodiment, performed in the above manner. Thus there may be, for example, and is in an embodiment, a plurality of counters for tracking the processing of fragments in sub-regions that are maintained, with one counter (or appropriate set of counters) for each sub-region for which the processing of fragments is being tracked.

(On the other hand, the determination of when there are no more primitives to be rasterised for a tile (that all the primitives for a tile have been rasterised) may be, and is in an embodiment, performed globally (collectively) for a tile (for all the sub-regions of a tile together), i.e. such that it is tracked and indicated for all the sub-regions collectively of a tile when there are no more primitives to be rasterised for a tile (all the primitives for a tile have been rasterised).)

The writing of a set of rendered fragment data for a sub-region for a tile from the tile buffer to memory can be controlled on the basis of the tracking and processing of fragments for the sub-region of the tile in any suitable and desired manner. For example, and in an embodiment, this could comprise preventing the writing out of rendered fragment data for the sub-region until it has been determined that the processing of all fragments for the sub-region of the tile has been finished.

In an embodiment, the controlling of the writing of a set of rendered fragment data for a sub-region of a tile from the tile buffer to memory on the basis of the tracking of the processing of fragments for the sub-region comprises the triggering of the writing out of (and the writing out of) a set of rendered fragment data for the sub-region of the tile from the tile buffer to memory in response to it being determined that the processing of all fragments for the sub-region of the tile has been finished.

Thus in an embodiment, the controlling of the writing of a set of rendered fragment data for a sub-region of a tile from the tile buffer to memory on the basis of the tracking of the processing of fragments for a sub-region of a tile comprises triggering the writing out of (and writing out) a set of rendered fragment data for the sub-region of the tile from the tile buffer to memory in response to it being determined that the processing of all fragments for the sub-region of the tile has been finished.

Correspondingly, the operation in the manner of the technology described herein is in an embodiment used to control and facilitate the writing out of, and to write out, rendered fragment data for different sub-regions of a tile separately to the writing out of rendered fragment data of other sub-regions of the tile (and of other tiles). Thus, and in an embodiment each, sub-region of a tile can in an embodiment be written out from the tile buffer to memory in the manner of the technology described herein, separately to, and independently of, other sub-regions of the tile (and of other tiles).

As discussed above, in embodiments at least, this can be, and is in an embodiment, used to allow write out of (a set of) rendered fragment data for a sub-region of a tile to be begun (and potentially completed) before at least some fragments that fall within other sub-region(s) of the (same) tile have finished being processed.

Thus, in an embodiment, the controlling of the writing out of render fragment data for a sub-region of a tile to memory on the basis of the tracking of the processing of fragments for the sub-region of the tile comprises (triggering the) writing of a set of rendered fragment data for the sub-region of the tile to memory before the writing of rendered fragment data for another sub-region of the tile to memory, and, in an embodiment, while the processing of fragments for another sub-region of the tile is still being performed (i.e. before the processing of fragments for another sub-region of the tile has been finished).

Correspondingly, the operation is in an embodiment such that fragments for other sub-regions (to the sub-region for which a set of rendered fragment data is being written to memory) can, and will, continue to be processed, while the set of rendered fragment data for a sub-region is written out from the tile buffer to memory.

In these arrangements, the writing of a set of rendered fragment data for a sub-region of a tile to memory is in an embodiment at least begun (where that is triggered) whilst the processing of fragments for other sub-regions is continuing, and before the processing of all the fragments for other sub-regions has been finished. In an embodiment the arrangement is such that, where possible, the set of rendered fragment data for a sub-region of a tile can finish being written out of the tile buffer to memory before the processing of all of the fragments for another sub-region of the tile has finished.

Although the technology described herein has been described above primarily with reference to the processing in respect of a given, single tile of a render output being generated, as will be appreciated by those skilled in the art, the operation in the manner of the technology described herein is in an embodiment used for and when processing plural tiles of a render output being generated and in an embodiment for each (for all) tiles of a render output being generated. Correspondingly, the operation in the manner of the technology described herein is in an embodiment performed for successive render outputs being generated, and so on.

The Applicants have further recognised that as the technology described herein facilitates the writing out of rendered fragment data for sub-regions of a tile from the tile buffer to memory separately to other sub-regions of a tile, that can also result in storage capacity in the tile buffer that was previously used for a sub-region becoming free before the entire tile that the sub-region belongs to has been written out from the tile buffer to memory. Thus a sub-region can be written out from the tile buffer to free up storage capacity in the tile buffer (e.g., and in an embodiment, for, for example, and in an embodiment, another sub-region of the same tile, and/or a sub-region of another tile) before the entirety of a tile has been finished and written out to the memory.

Thus, in an embodiment, (storage) capacity in the tile buffer for storing rendered fragment data for a tile is allocated on a sub-region-by-sub-region basis, i.e. such that capacity in the tile buffer for storing rendered fragment data can be allocated to, and on the basis of, individual sub-regions of a tile separately (to other sub-regions of the tile and to sub-regions of other tiles).

This is in an embodiment then used to facilitate the storing of sub-regions from different tiles simultaneously in the tile buffer and to, in particular, and in an embodiment, once a sub-region for a first tile has been written out from the tile buffer to the memory, allocate the tile buffer capacity for that written out sub-region to a new sub-region of a tile (which may be a sub-region of the same tile for which capacity in the tile buffer has yet to be allocated), or a sub-region of another (e.g. the next) tile to be processed (e.g., and in an embodiment, where all the sub-regions of the current tile have already been allocated capacity in the tile buffer (or finished)).

This may then be used, for example, to allow sub-regions of a plurality of (different) tiles to be processed concurrently. For example, when rendered fragment data for one or more sub-regions of a (first) tile is stored in the tile buffer, the tile buffer may have capacity available for storing rendered fragment data for one or more sub-regions of another (second) tile (e.g. even if the tile buffer does not have capacity available for storing rendered fragment data for the entire second tile).

Correspondingly, in an embodiment, the processing of individual sub-regions of a tile (and in particular the generation and writing of rendered fragment data to the tile buffer for individual sub-regions of a tile) can be, and is in an embodiment, controlled and able to be performed independently of other sub-regions for a tile (or for another tile), e.g., and in an embodiment, in dependence upon whether capacity in the tile buffer has been allocated for storing rendered fragment data for a (the) sub-region.

In particular, in an embodiment, the generation and writing of rendered fragment data to the tile buffer for a sub-region can in an embodiment be controlled, and in particular permitted or allowed, for separate sub-regions independently, and in particular so as to prevent the writing of (or avoid the need to write) rendered fragment data to the tile buffer for a sub-region when (storage) capacity for the sub-region is not allocated (has yet to be allocated) in the tile buffer (and conversely to permit the generation and the storing of rendered fragment data for a sub-region of a tile in the tile buffer when there is (storage) capacity for the sub-region allocated in the tile buffer).

Thus, in an embodiment, the graphics processor is operable to (and includes an appropriate control circuit configured to) control the processing of tiles, and in particular the processing of fragments and the generation of rendered fragment data for a tile, on a sub-region-by-sub-region basis, i.e. such that (aspects of) the processing of an individual sub-region within a tile can be started/performed independently of the processing of other sub-regions for the tile (e.g., and in an embodiment, such that some or all of the processing for one or more sub-regions of a tile may be started (e.g. when there is capacity for that allocated in the tile buffer), while some or all of the processing of other sub-regions for the tile is not yet begun (e.g. because there is not yet capacity in the tile buffer for those sub-regions).

Correspondingly, in these embodiments where the processing of individual sub-regions for a tile can be controlled independently in this manner, then in an embodiment, (aspects of) the processing of fragments for the individual sub-regions is in an embodiment correspondingly controlled, e.g., and in an embodiment, to allow the processing of fragments for a sub-region for which capacity has been allocated in the tile buffer to proceed, but to stall (delay) (some or all of) the processing of any fragments for a sub-region of a tile for which there is not yet allocated capacity in the tile buffer.

Thus, in an embodiment, the processing of fragments (e.g. by the rendering stage/circuit) is controlled based on, and in accordance with, which sub-region of a tile a fragment is determined to fall within. For example, and in an embodiment, the processing of fragments in a sub-region of a tile for which capacity has been allocated in the tile buffer can be, and is in an embodiment, allowed to proceed, but some or all of the processing of fragments in a sub-region of a tile for which capacity has not been allocated in the tile buffer can be and is in an embodiment not performed (stalled/delayed).

Thus, in an embodiment, the processing of a tile is begun without waiting for there to be capacity for all of the sub-regions of the tile (for all of the tile) allocated in the tile buffer, but then processing of individual fragments/sub-regions for the tile is controlled (and in an embodiment permitted or delayed) based on the allocation of capacity for storing rendered fragment data for sub-regions of the tile in the tile buffer, and the sub-regions of the tile that the fragments are determined to fall within.

It would be possible in this regard simply to prevent (stall) all processing for a sub-region of a tile unless and until capacity for that sub-region has been allocated in the tile buffer. However, in an embodiment, at least some processing for a sub-region of a tile is allowed to proceed, even if capacity has not yet been allocated for the sub-region in the tile buffer, but with later processing for the tile (e.g., and in an embodiment, that will actually require the use of the tile buffer) then being prevented (not being performed) unless and until capacity for the sub-region has been allocated in the tile buffer.

In this case therefore, rasterisation of primitives to fragments for a sub-region may, and in an embodiment is, started and performed before (and without waiting for) any allocation of capacity in the tile buffer for the sub-region, but then later processing (e.g. rendering) of fragments for the sub-region is stalled (at an appropriate point in the processing) unless and until capacity for the sub-region has been allocated in the tile buffer.

Allowing the processing of sub-regions for tiles to be controlled and performed independently of each other, as and when storage capacity in the tile buffer becomes free, and in particular facilitating the writing out of rendered fragment data for sub-regions of a tile before other sub-regions of the tile are finished, facilitates supporting the use of larger tile sizes for a given tile buffer capacity, since an appropriate throughput of rendered fragment data for tiles can be achieved by processing different sub-regions of tiles after others, rather than having to ensure that the tile buffer always has capacity for one or more entire tiles.

In an embodiment, the sub-region controlling circuit is configured to determine that there is memory in the tile buffer available to be allocated for storing rendered fragment data for a sub-region of a tile that a fragment is determined to fall within in response to a set of rendered fragment data for another sub-region being written from the tile buffer to memory. However, this is not essential, and the sub-region controlling circuit may, for example, be configured to determine whether there is memory in the tile buffer available to be allocated for storing rendered fragment data for a sub-region of a tile that a fragment is determined to fall within periodically and/or when (e.g. in response to when) it is determined that there is not (currently) memory in the tile buffer allocated for storing rendered fragment data for a sub-region of a tile that a fragment is determined to fall within.

It will be appreciated that in these arrangements, capacity in the tile buffer (when it becomes available) will need to be, and will be, allocated to respective sub-regions of tiles that require capacity in the tile buffer (which may be other sub-regions of a tile for which other sub-regions are currently being stored in the tile buffer, or sub-regions of a new tile for which there are not yet any sub-regions being stored in the tile buffer). This can be done in any suitable and desired manner.

In an embodiment, it is tracked when a sub-region requires capacity in the tile buffer. In an embodiment, a record is maintained of sub-regions that are waiting for capacity in the tile buffer, with capacity in the tile buffer then being allocated to waiting sub-regions in an appropriate manner (e.g., and in an embodiment, as capacity in the tile buffer becomes available (e.g., and in an embodiment, because a sub-region currently being stored in the tile buffer is written out of the tile buffer)).

This can be achieved in any suitable and desired manner. For example a record of sub-regions awaiting capacity in the tile buffer could be maintained, and then when capacity in the tile buffer becomes available, that capacity allocated to one of the waiting sub-regions, e.g. on a first in, first out, or some other basis. For example, it could also be tracked how many fragments are ready for processing for a sub-region of a tile that is awaiting capacity in the tile buffer with the tile buffer capacity allocation then being based on such tracking, and/or waiting sub-regions could be allocated any new capacity that becomes available based on which tiles they belong to.

In an embodiment, when (it is recognised that) a new sub-region falls to be processed (e.g. because a new tile falls to be processed, or, e.g. fragments, for a new sub-region of a tile that is already being processed fall to be processed (are ready to use the tile buffer)), then in an embodiment an appropriate request for capacity in the tile buffer for the sub-region in question can be and is made, in response to which request capacity in the tile buffer will (eventually) be allocated (with, as discussed above, the processing for the sub-region in question (in an embodiment) being appropriately delayed (stalled) until capacity in the tile buffer for rendered fragment data for the sub-region is allocated).

In response to such a request, if there is capacity already available in the tile buffer, then the "waiting" sub-region can be allocated the available capacity in the tile buffer (and its processing proceed). On the other hand, when there is not available capacity in the tile buffer when a request for capacity in the tile buffer for a sub-region is made, then in an embodiment the request for capacity in the tile buffer is appropriately recorded (e.g. queued) pending capacity in the tile buffer becoming available (until capacity in the tile buffer becomes available (e.g., and in an embodiment, because a sub-region currently being stored in the tile buffer is written out of the tile buffer)).

Then, when capacity becomes (and in response to capacity becoming) available in the tile buffer, a waiting sub-region can be allocated the (now free) capacity in the tile buffer.

The Applicants have recognised in this regard that there may be plural sub-regions of tiles that are waiting for capacity in the tile buffer at any one time. Thus, in an embodiment, the graphics processor can maintain a pool of (potentially plural) tile buffer sub-region capacity requests, and will allocate capacity in the tile buffer to requests in the pool as and when capacity becomes free in the tile buffer (e.g. because a set of rendered fragment data for a sub-region has been written from the tile buffer to memory).

In this case, the pool of tile buffer capacity requests for sub-regions could be operated, for example, as a (simple) first in, first out, queue, with each sub-region being added to the queue, and then being allocated capacity in the tile buffer in the queued order.

Additionally or alternatively, more sophisticated schemes for allocating capacity in the tile buffer to (pooled) capacity allocation requests could be used, if desired.

For example, this could be based on how many currently pending fragments there are for each sub-region that is awaiting tile buffer capacity (with the sub-region with the most waiting fragments then being allocated capacity, for example).

For example, it could be tracked (counted) how many fragments are ready for processing for a sub-region of a tile that is awaiting capacity in the tile buffer, with the tile buffer capacity allocation then being made based on the number of fragments that are ready for processing for each sub-region that is waiting for capacity in the tile buffer.

Additionally or alternatively, the tile buffer allocation requests could be granted (serviced) based on which tiles any sub-regions that are awaiting capacity in the tile buffer are for (e.g. such that sub-regions for tiles that already have some capacity allocated in the tile buffer are preferentially allocated any new capacity that becomes available (i.e. so as to (try to) finish tiles completely, in preference to (before) starting a new tile)).

The graphics processor correspondingly in an embodiment comprises an appropriate tile buffer capacity allocation circuit that is operable to and configured to allocate capacity in the tile buffer to sub-regions of tiles being rendered, in response to a need for (e.g. requests for) capacity in the tile buffer for sub-regions of tiles being rendered (and in an embodiment in response to capacity in the tile buffer for a sub-region of a tile being rendered becoming available in the tile buffer (e.g. and in an embodiment in response to the (finishing of) writing of rendered fragment data for a sub-region from the tile buffer.

The above describes the particular elements of the graphics processor and graphics processing pipeline that are involved in the operation in the manner of the technology described herein. As will be appreciated by those skilled in the art, the graphics processor and processing pipeline can otherwise include, and in an embodiment does include, and execute, any one or one or more, and in an embodiment all, of the other processing circuits/stages that graphics processors and graphics processing pipelines may (normally) include.

Thus, for example, the graphics processor and graphics processing pipeline in an embodiment also includes one or more of, and in an embodiment plural of, and in an embodiment all of: one or more shader stages/circuits (such as a vertex shader or shaders); one or more (early and/or late) culling (e.g. depth and/or stencil) testers (culling (e.g. depth and/or stencil) test stages), a blender (blending stage), etc.

The writing out of the rendered fragment data from the tile buffer to the output buffer (in memory) may also comprise, for example, downsampling and/or compressing the data from the tile buffer as it is written out.

Other arrangements for the graphics processor and the graphics processing pipeline that is being executed would, of course, be possible.

In an embodiment, the graphics processor comprises, and/or is in communication with, one or more memories and/or memory devices that store the data described herein, and/or that store software for performing the processes described herein. The graphics processor may also be in communication with a host microprocessor, and/or with a display for displaying images based on the output of the graphics processor.

The render output to be generated may comprise any render output that can be and is to be generated by a graphics processor and processing pipeline, such as a frame for display, a render-to-texture output, etc. In an embodiment, the render output is an output frame, and in an embodiment an image.

In an embodiment, the various functions of the technology described herein are carried out on a single graphics processing platform that generates and outputs the (rendered) data that is, e.g., written to a frame buffer for a display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuits of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

The technology described herein and present embodiments relate to computer graphics processing.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

FIG. 1 shows an exemplary graphics processing pipeline 10.

The graphics processing pipeline 10 shown in FIG. 1 is a tile-based renderer and will thus produce tiles of a render output data array, such as an output frame to be generated.

FIG. 1 shows the main elements and pipeline stages of the graphics processing pipeline. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuits/circuitry and/or processing logic, etc., for performing the necessary operation and functions.

The graphics processing pipeline 10 shown in FIG. 1 includes a number of stages, including vertex shader 200, a hull shader 201, a tesselator 202, a domain shader 203, a geometry shader 204, a tiler 205, a primitive list reader 80, a rasterisation stage 206, an early Z (depth) and stencil test stage 207, a renderer in the form of a fragment shading stage 208, a late Z (depth) and stencil test stage 209, a blending stage 210, a tile buffer 211 and a downsampling and writeout (multisample resolve) stage 212.

The vertex shader 200 takes the input data values (vertex attribute values) associated with the vertices, etc., defined for the output to be generated, and processes those data values to generate a set of corresponding "vertex shaded" output data values for use by subsequent stages of the graphics processing pipeline 1.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attribute values from the world or user space that they are initially defined for to the screen space that the output of the graphics processing system is to be displayed in, modifying the input data to take account of the effect of lighting in the image to be rendered, etc.

As mentioned above, the, e.g., vertex shading operation may also convert the originally defined vertex position coordinates to a different, e.g., lower precision, form to be used later on in the graphics processing pipeline.

The hull shader 201 performs operations on sets of patch control points and generates additional data known as patch constants. The tessellation stage 202 subdivides geometry to create higher-order representations of the hull, and the domain shader 203 performs operations on vertices output by the tessellation stage (similar to a vertex shader). The geometry shader 204 may (if run) generate primitives such as a triangles, points or lines for processing.

Once all the primitives to be rendered have been appropriately processed, e.g. transformed, and/or, e.g., generated by the geometry shader, the tiler 205 then determines which primitives need to be processed for the tiles that the render output has been divided into for processing purposes. To do this, the tiler 205 compares the location of each primitive to be processed with the tile positions (e.g.), and adds the primitive to a respective primitive list applying to a tile that it determines the primitive could (potentially) fall within. Any suitable and desired technique for sorting and binning primitives into primitive lists, such as exact binning, or bounding box binning or anything in between, can be used for the tiling process.

Once the tiler has completed the preparation of the primitive lists, then each tile can be rendered.

To do this, each tile is processed by the graphics processing pipeline stages shown in FIG. 1 that follow the tiler 205.

Thus, when a given tile is being processed, each primitive that is to be processed for that tile (that is listed in a primitive list applying to that tile) is passed to the rasteriser 206 by a primitive list reader 80.

The rasterisation stage 206 of the graphics processing pipeline 10 operates to rasterise the primitives into individual graphics fragments for processing.

To do this, the rasteriser 206, particularly a primitive set-up stage 81 of the rasteriser 206, operates to determine, from the vertex shaded vertices provided to the primitive set-up stage 81, edge information representing each primitive edge of a primitive to be rasterised. This edge information is then passed to a rasterisation stage 82 of the rasteriser 206, which rasterises the primitive to sampling points and generates graphics fragments having appropriate positions (representing appropriate sampling positions) for rendering the primitive.

(It will be appreciated that although FIG. 1 shows the primitive set-up stage 81 being part of a single rasterisation unit (the rasteriser 206 of FIG. 1), this is not required. It is possible for the primitive set-up stage to be separate from the rasteriser 206, e.g. at a stage of the graphics processing pipeline that is (e.g. immediately) before the rasteriser 206, but after the tiler 205.)

The fragments generated by the rasteriser are then sent onwards to the rest of the pipeline for processing.

The early Z/stencil stage 207 performs a Z (depth) test on fragments it receives from the rasteriser 206, to see if any fragments can be discarded (culled) at this stage. To do this, it compares the depth values of (associated with) fragments issuing from the rasteriser 206 with the depth values of fragments that have already been rendered (these depth values are stored in a depth (Z) buffer that is part of the tile buffer 211) to determine whether the new fragments will be occluded by fragments that have already been rendered (or not). At the same time, an early stencil test is carried out.

Fragments that pass the fragment early Z and stencil test stage 207 are then sent to the fragment shading stage 208. The fragment shading stage 208 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 208 is in the form of a shader pipeline (a programmable fragment shader).

There is then a "late" fragment Z and stencil test stage 209, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 211 to determine whether the fragment data for the new fragments should replace the fragment data of the fragments that have already been rendered, by comparing the depth values of (associated with) fragments issuing from the fragment shading stage 208 with the depth values of fragments that have already been rendered (as stored in the depth buffer). This late fragment depth and stencil test stage 209 also carries out any necessary "late" alpha and/or stencil tests on the fragments.

The fragments that pass the late fragment test stage 209 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 as rendered fragment data, from where the rendered fragment data can be written out to memory, for example, be output to a frame buffer 213 for display. The depth value for an output fragment is also written appropriately to a Z-buffer within the tile buffer 211. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 211 is input to a downsampling (multisample resolve) writeout unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile can be processed, and so on, until sufficient tiles have been processed to generate the entire render output (e.g. frame (image) to be displayed). The process is then repeated for the next render output (e.g. frame) and so on.

Other arrangements for a graphics processing pipeline would, of course, be possible.

The graphics processing pipeline as illustrated in FIG. 1 will be executed on and implemented by an appropriate graphics processing unit (GPU) (graphics processor) that includes the necessary functional units, processing circuits/circuitry, etc., operable to execute the graphics processing pipeline stages.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Figure 2:
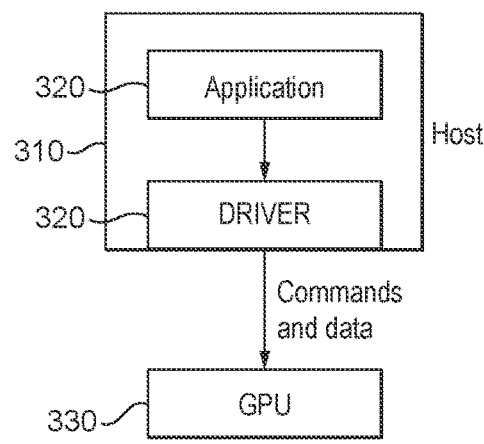
FIG. 2 illustrates schematically a typical computer graphics processing system.

Accordingly, as shown in FIG. 2 (which shows a typical computer graphics processing system), an application 320, such as a game, executing on a host processor 310 that requires graphics processing operations to be performed by an associated graphics processing unit (graphics processing pipeline) 330, will generate appropriate API (Application Programming Interface) calls that are interpreted by a driver 340 for the graphics processor 330 that is running on the host processor 310 to generate appropriate instructions to the graphics processor 330 to generate graphics output required by the application 320. To facilitate this, a set of instructions will be provided to the graphics processor 330 in response to instructions from the application 320 running on the host system 310 for graphics output (e.g. to generate a frame to be displayed).

As discussed above, the technology described herein relates to a graphics processor that can control the writing of (a set of) rendered fragment data for a sub-region of a tile from a tile buffer to memory on the basis of the tracking of the processing of fragments for the sub-region of the tile.

Figure 3:
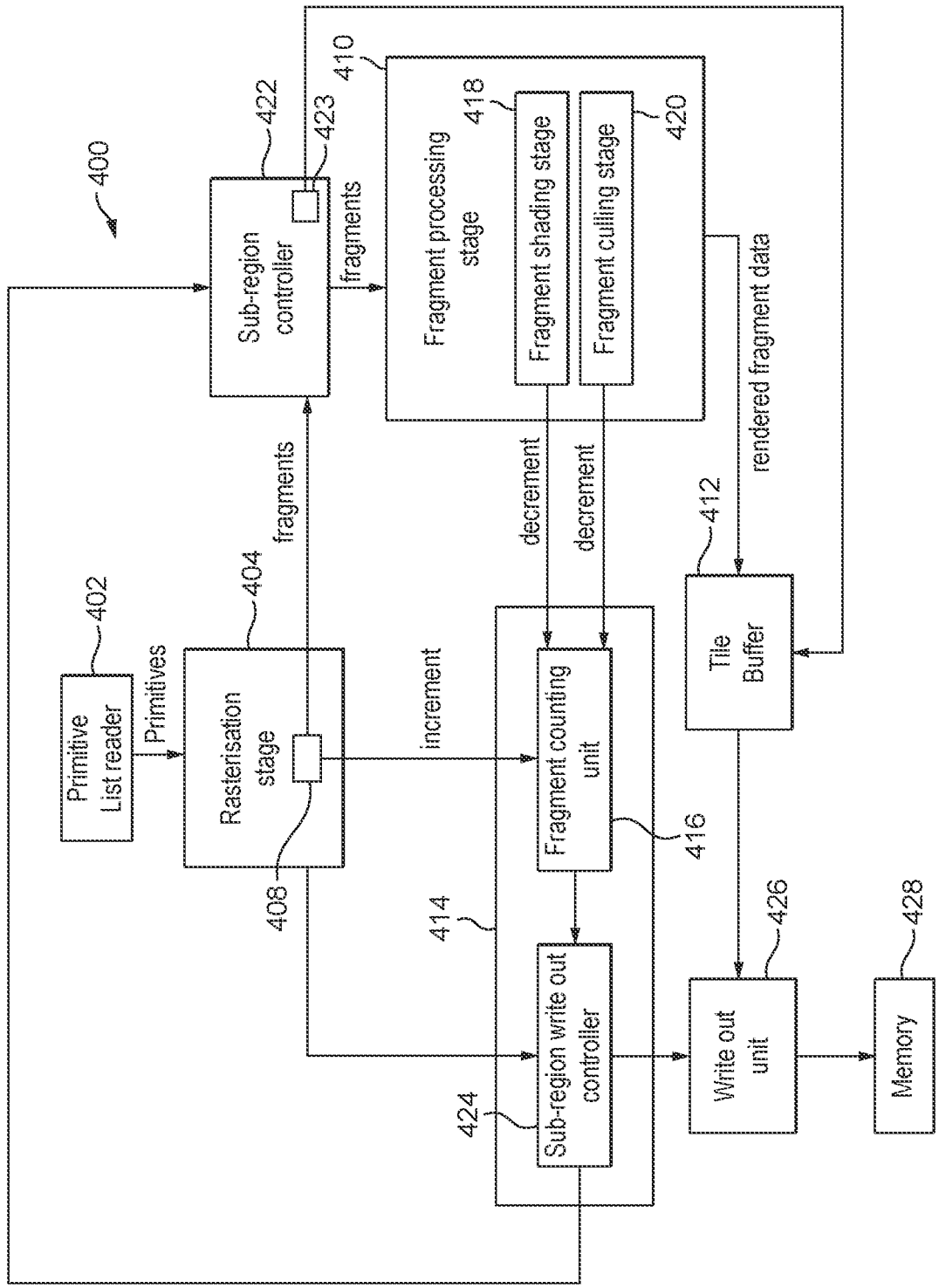
FIG. 3 illustrates schematically a graphics processor that is in accordance with embodiments of the technology described herein.

FIG. 3 show a graphics processor 400 that is in accordance with embodiments of the technology described herein.

As will be appreciated by those skilled in the art, there may be other components of the graphics processor 400 that are not shown in FIG. 3. It should also be noted here that FIG. 3 is only schematic, and that, for example, in practice the shown functional components may share significant hardware circuits, even though they are shown schematically as separate components in FIG. 3. It will also be appreciated that each of the components shown in FIG. 3 may be implemented as desired and will accordingly comprise, e.g., appropriate circuits/circuitry and/or processing logic, etc., for performing the necessary operation and functions.

The graphics processor 400 is a tile-based graphics processor and will thus produce tiles of a render output, such as an output frame to be generated.

The graphics processor 400 comprises a primitive list reader 402, and a rasterisation unit 404. The primitive list reader 402 reads primitive lists applying to a tile to be rendered and passes primitives to be rendered for a tile to the rasterisation unit 404. The rasterisation unit 404 is configured to rasterise the primitives into graphics fragments for processing. When rasterising a primitive, the rasterisation unit 404 determines what sampling positions of the render output fall within the primitive (are covered by the primitive), and generates graphics fragments having appropriate positions (representing appropriate sampling positions) for rendering the primitive accordingly.

When generating graphics fragments, a fragment sub-region determining circuit 408 of the rasterisation unit 404 determines which sub-region, of a plurality of sub-regions that a tile to be rendered is divided into, a fragment falls within, and indexes fragments according to which sub-region of a tile the fragment is determined to fall within.

Figure 5:
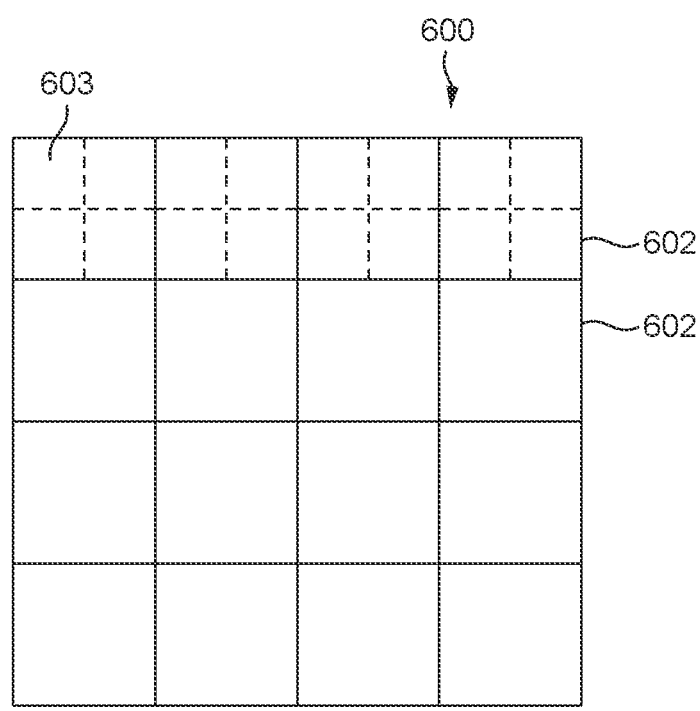
FIG. 5 shows schematically tiles of a render output divided into respective sub-regions.

FIG. 5 illustrates this, and shows an exemplary render output 600, such as a frame to be displayed, that is divided into an array of tiles 602 for rendering purposes. As shown in FIG. 5, the tiles are each divided into four respective sub-regions 603, corresponding to respective quadrants of the tiles. (This is just shown for the top row of tiles illustrated in FIG. 5, but each tile that the render output is divided into for rendering purposes will correspondingly be divided into a set of four sub-regions 603 for fragment tracking purposes.)

Each of the plurality of sub-regions 603 that a tile is divided into corresponds to a respective set of sampling positions for the tile and to determine which sub-region a fragment falls within, the fragment sub-region determining circuit 408 determines which respective set of sampling positions that the respective sub-regions correspond to the sampling position(s) for the fragment is within.

FIG. 3 depicts the rasterisation unit 404 comprising the fragment sub-region determining circuit 408. However, this is not essential and the fragment sub-region determining circuit 408 may be provided as a component of the rasterisation unit 404 or may be provided separately.

The graphics processor 400 further comprises a fragment processing (rendering) unit 410 configured to process graphics fragments to generate rendered fragment data for a tile of a render output being generated, a tile buffer 412 operable to store rendered fragment data for a tile generated by the fragment processing (rendering) unit 410, and a fragment tracking unit 414 configured to track the processing of fragments for sub-regions of the tile, to determine when the processing of all fragments for a given sub-region has been finished.

The fragment processing unit 410 executes a plurality of processing stages for processing fragments, including a fragment shading stage 418 and one or more fragment culling stages 420. The plurality of processing stages may, for example, include the early Z (depth) and stencil test stage 207, fragment shading stage 208, late Z (depth) and stencil test stage 209, and blending stage 210 of the graphics processing pipeline of FIG. 1. (FIG. 3 shows a single fragment culling stage 420 for clarity, but there may be more than one fragment culling stage, such as early and late fragment culling stages, if desired, each of which will operate in the manner described.)

The fragment shading stage 418 is configured to process fragments to generate rendered fragment data, and store the rendered fragment in the tile buffer 412. The fragment culling stage(s) 420 is configured to cull fragments so as to thereby end their processing by the fragment processing stage 410. Accordingly, the processing of a fragment by the fragment processing stage 410 may finish when a fragment is culled by the fragment culling stage(s) 420 or may finish when rendered fragment data for a fragment has finished being generated and is written to the tile buffer 412.

The graphics processor 400 also comprises a sub-region controller/controlling circuit 422 that comprises a tile buffer capacity allocation circuit 423 that is configured to allocate (storage) capacity in the tile buffer 412 for storing rendered fragment data for a (particular) sub-region of a tile. The sub-region controller/controlling circuit 422 is configured to control the fragment processing stage 410 to store rendered fragment data in the tile buffer for (only) those sub-region(s) for which capacity has been allocated in the tile buffer 412.

To do this, the sub-region controller 422 prevents a fragment from being passed to the fragment processing stage 410 until there is memory allocated in the tile buffer 412 for storing rendered fragment data for the sub-region that the fragment was determined to fall within (is indexed as falling within).

Alternatively, fragments may (for example) be passed to the fragment processing stage 410 for processing irrespective of which sub-region of a tile the fragment falls within, and the sub-region controller 422 controls the fragment processing stage 410 to prevent rendered fragment data for a sub-region being written to the tile buffer 412 until storage is allocated in the tile buffer 412 for storing rendered fragment data for that sub-region. For example, the sub-region controller may be configured to control the fragment processing stage 410 so that processes that could (potentially) generate rendered fragment data are stalled for a fragment until capacity is allocated in the tile buffer for the sub-region of a tile that the fragment falls within, and/or control the fragment processing stage 410 so that requests for generated rendered fragment data to be written to the tile buffer 412 are stalled until there is capacity allocated in the tile buffer 412 for the sub-region of a tile that the generated rendered fragment data is for.

When there is not storage allocated in the tile buffer for storing rendered fragment data for a sub-region that a fragment has been determined to fall within, the sub-region controller 422 stores an indication that capacity in the tile buffer 412 is required to be allocated for that sub-region and can allocate capacity in the tile buffer 412 for that sub-region once (e.g. as and when) capacity in the tile buffer 412 becomes available.

To track the processing of fragments determined to fall within a sub-region, the fragment tracking unit 414 comprises a fragment counting unit 416 for counting fragments determined to fall within a sub-region that have not finished being processed by the fragment processing stage 410. The fragment counting unit 416 may comprise a single counter for counting fragments in a single sub-region of a tile (at a given time). However, in an embodiment the fragment counting unit 416 comprises a plurality of different counters for (concurrently) counting fragments for plural different sub-regions of a tile (or tiles).

The graphics processor 400 is configured for the fragment sub-region determining circuit 408 to increment a value of a counter of the fragment counting unit 416 for a sub-region of a tile when a fragment is generated that is determined to fall within the sub-region of the tile. The graphics processor 400 is configured for the fragment processing stage 410 to decrement a value of a counter of the fragment counting unit 416 for a sub-region of a tile when the fragment processing stage 410 finishes processing a fragment determined to fall within the sub-region. The fragment counting unit 416 can thereby keep track of whether there are "live" fragments for a sub-region of a tile that have been generated but are yet to finish being processed.

As discussed above, the processing of a fragment by the fragment processing stage 410 may finish when a fragment is culled by the fragment culling stage(s) 420 or may finish when rendered fragment data for a fragment has finished being generated and is written to the tile buffer 412. In either case, the fragment processing stage 410 is configured decrement a value of a counter of the fragment counting unit 416 for the sub-region that a fragment that has finished being processed was determined to fall within (is indexed as falling within).

The fragment tracking unit 414 further comprises a sub-region writeout controller/controlling circuit 424 that is configured to determine when all of the fragments for a sub-region of a tile have been generated and processed. To facilitate this, the rasteriser 404 is configured to indicate to the sub-region writeout controller 424 when all of the primitives for an (entire) tile have finished being processed by the rasterisation stage 404 (i.e. so that any and all fragments for the tile will have been generated). In the present embodiment this indication is sent when an "end of tile" primitive that is included in a primitive list to indicate the end of a tile reaches the output of the rasteriser.

As shown in FIG. 3, the fragment counting unit 416 is configured to indicate to the sub-region writeout controller 424 when there are no fragments that have been determined to fall within a sub-region of a tile still being processed or still to undergo processing (there are currently no "live" fragments for a sub-region).

The sub-region writeout controller 424 determines that all of the fragments for a sub-region of a tile have been generated and processed when the rasteriser 404 indicates that the end of the tile has been reached (i.e. all processing of the primitives for the tile by the rasterisation unit 404 has finished) (thereby indicating that no more fragments will be rasterised for the tile in question), and, once that is the case (all processing of the primitives for the tile by the rasterisation unit 404 has finished), the fragment counting unit 416 indicates that the processing of (any (and all)) remaining fragments determined to fall within the sub-region of the tile has finished (i.e. the "live" fragment count for the tile sub-region is zero).

It will be appreciated in this regard, that the sub-region writeout controller 424 essentially determines when all the processing of the primitives for a tile by the rasterisation unit 404 has been completed (thereby indicating that no more fragments will be rasterised for the tile in question), and then, once there will be no more fragments rasterised for the tile in question, whether and when any (and all) remaining fragments for a sub-region of the tile has finished. Thus the sub-region writeout controller 424 will first determine that all the processing of primitives for a tile by the rasterisation unit has finished (such that there will be no more fragments rasterised for any of the sub-regions in the tile in question), and then determines and monitors when the processing of any remaining fragments for respective sub-regions in the tile has finished (based on the "live" fragment count indicated for the respective sub-regions of the tile by the fragment counting unit 416).

In other words, the present embodiments count the number of fragments currently "alive" within each sub-region of the tile, and then at the point where there are no more primitives to be rasterised in a tile, the "live" fragment counter for each sub-tile is used to determine when and that a sub-tile has finished processing, and is therefore ready to be written out from the tile buffer to memory. In particular, when the rasteriser has reached the end of all the primitive lists applying to a tile, and the "live" fragment count for a sub-region indicates that there are no more "live" fragments for the sub-region, then it can be determined that the tile sub-region is finished, such that it can be written out to memory.

The graphics processor further comprises a writeout unit 426. When the sub-region writeout controller 424 determines that all the fragments for a sub-region of a tile have been generated and processed, the sub-region writeout controller controls the writeout unit 426 to write (a set of) rendered fragment data for that sub-region from the tile buffer 412 to memory 428 (e.g. to a frame buffer). The memory 428 may be external to the graphics processor 400 (but e.g. part of the same graphics processing/data processing system).

Once the writeout unit has written (a set of) rendered fragment data for a sub-region of a tile to the memory 428, the sub region writeout controller 424 provides an indication of this to the sub-region controller 422, so that the sub-region controller 422 can allocate the storage capacity in the tile buffer 412 that was used to store the rendered fragment data for the tile sub-region that has been written to the memory 428, to now be used for storing rendered fragment data for another sub-region of a tile to be processed (as appropriate).

Figure 4:
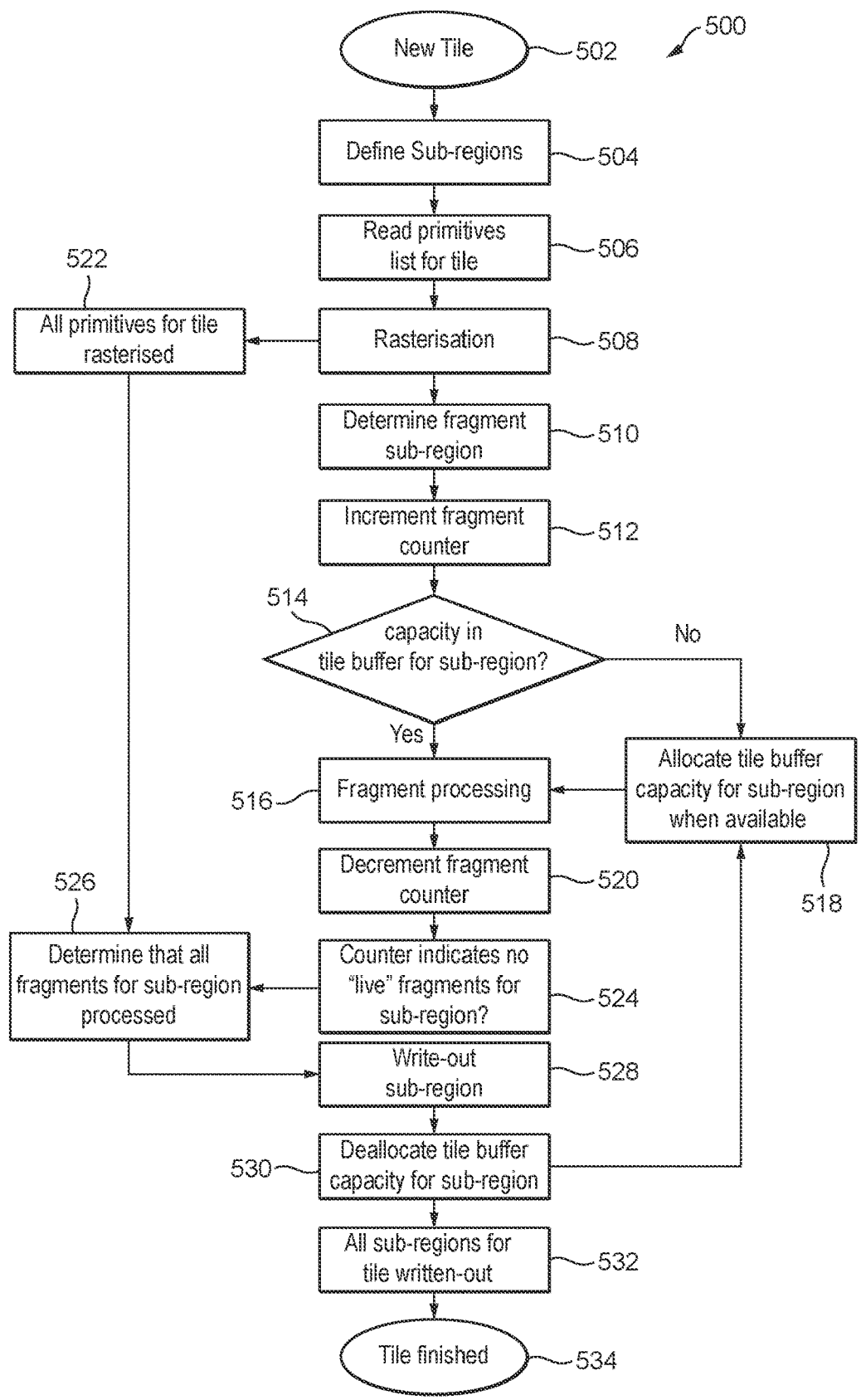
FIG. 4 illustrates schematically a method of graphics processing according to embodiments of the technology described herein.

FIG. 4 shows the relevant aspects of the operation of the graphics processor shown in FIG. 3 in embodiments of the technology described herein.

As shown in FIG. 4, when a new tile is to be rendered for a render output (step 502), a plurality of sub-regions are defined (step 504) that the tile is divided into for fragment tracking purposes. Each sub-region for the tile will correspond to a respective set of sampling positions for the tile.

The primitives that need to be processed for a tile are read from one or more primitive lists that apply to the tile (step 506).

The primitives for the tile are then rasterised (step 508) to generate graphics fragments for rendering for the tile. It is also determined which sub-regions of the tile fragments generated by the rasterisation stage fall within (step 510) and the fragments are indexed to indicate which sub-region they fall into. When a fragment is determined to fall within a sub-region, a counter for that sub-region is incremented (step 512).

After it has been determined which sub-region a fragment falls within, it is determined (step 514) whether there is allocated capacity in the tile buffer for the sub-region that the fragment was determined to fall within.

When there is (already) capacity allocated in the tile buffer for the sub-region that a fragment falls within, the fragment is processed (step 516) and if the processing of the fragment generates rendered fragment data, the rendered fragment data is (appropriately) written to the tile buffer.

When there is not capacity allocated for the sub-region that the fragment falls into (e.g. because it is the first fragment that has been determined to fall within that sub-region), it is determined that capacity in the tile buffer is required to be allocated for that sub-region. The sub-region is added to a list of waiting sub-regions, and capacity in the tile buffer is allocated for storing rendered fragment data for the sub-region at an appropriate time (step 518). For example, capacity in the tile buffer can be allocated for storing rendered fragment data for a next sub-region to be processed after rendered fragment data for another sub-region has finished being generated and is written out of the tile buffer to memory.

Once capacity in the tile buffer has been allocated for storing rendered fragment data for a sub-region, fragments determined to fall within that sub-region can be processed (step 516), and if the processing of the fragment generates rendered fragment data, the rendered fragment data will be written to the tile buffer.

When the processing of a fragment is finished (e.g. either by culling or by rendered fragment data generated for the fragment being written to the tile buffer), the fragment counter for the sub-region that the fragment fell within is decremented (step 520).

In this way the fragment counter for a sub-region keeps track of the current amount of "live" fragments for the sub-region, i.e. the generated fragments that have been determined to fall within the sub-region but that have not finished being processed.

Steps 508-520 will be carried out for all the (plural) primitives to be processed for a tile, so that any fragments for those primitives are processed in the manner discussed above.

When all the primitives for a (entire) tile have been rasterised (step 522), and the fragment counter for a sub-region indicates that there are no remaining "live" fragments for that sub-region (i.e. there is no outstanding processing to be finished for fragments that have been determined to fall within that sub-region), it is determined (step 526) that the processing of all of the fragments for the sub-region has been finished (since there are no "new" fragments to be generated, and all of the fragments determined to fall within the sub-region have been processed).

When it is determined that the processing of all the fragments for a sub-region of a tile has been finished, a set of rendered fragment data for the sub-region is written out of the tile buffer to memory (step 528).

Once the set of rendered fragment data has finished being written out of the tile buffer, capacity in the tile buffer can be deallocated from being for storing rendered fragment data for that sub-region (step 532) (and, e.g., the capacity that has been deallocated can now be allocated as being for storing rendered fragment data for another (e.g. a next) sub-region to be processed).

When sets of rendered fragment have been written to memory for all of the sub-regions of a tile (step 532), the rendering of that (entire) tile will have been finished (step 534), and the rendered fragment data for that tile can be used as required for representing a region of the render output (e.g. for display or for any further processing).

Figure 6A:
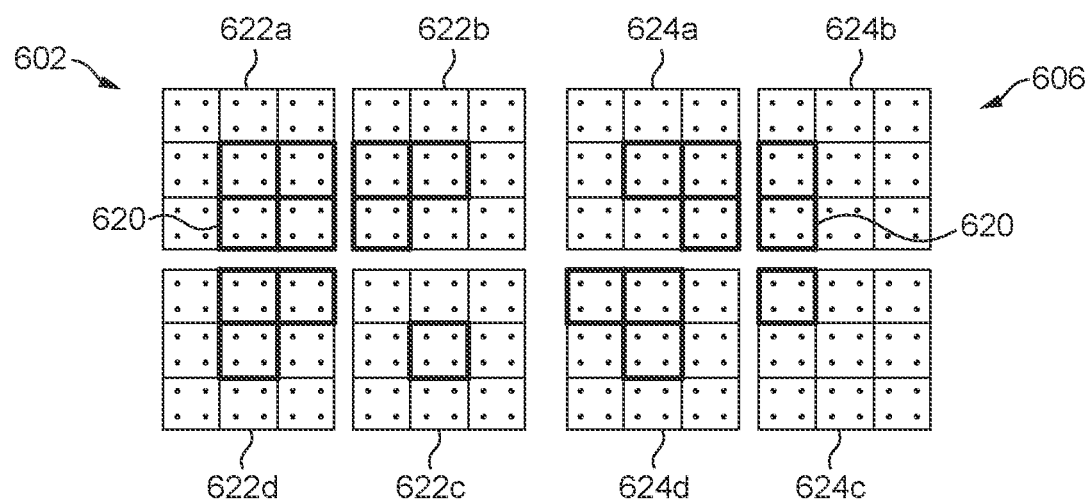
FIGS. 6A, 6B and 6C illustrate schematically the processing of tiles in accordance with embodiments of the technology described herein.
Figure 6A:
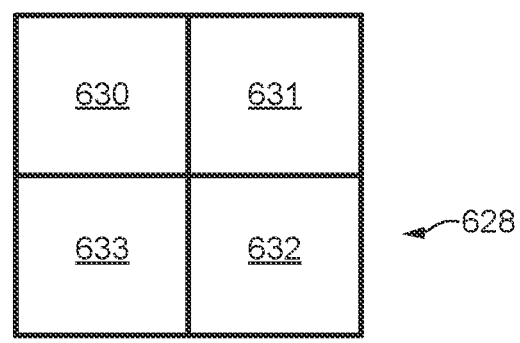
Figure 6B:
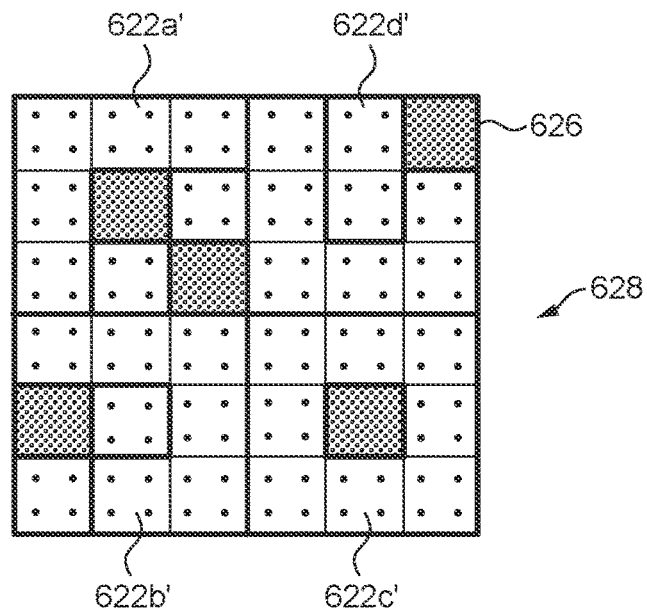
Figure 6C:
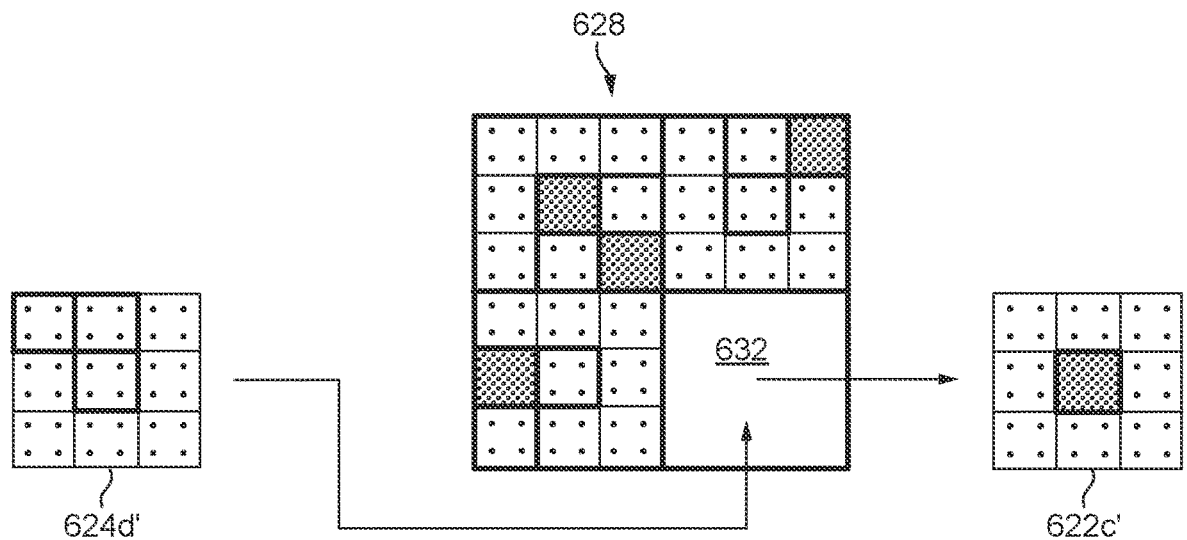

FIGS. 6A-C illustrate how capacity in the tile buffer may be allocated for storing rendered fragment data when processing tiles in accordance with embodiments of the technology described herein.

FIG. 6A shows a tile buffer 628 to be used to store rendered fragment data when tiles 602 and 606 are being rendered (with each of tiles 602 and 606 being sub-divided into respective sub-regions 622a-d and 624a-d, respectively, as shown in FIG. 6A). FIG. 6A also shows exemplary fragments 620 that have been rasterised from primitives falling within the respective tiles (and which of the respective sub-regions the rendered fragments fall within).

The tile buffer's 628 storage capacity is separately allocatable as four separate storage allocations ("chunks") 630-633, with each allocation having the capacity to store the rendered fragment data of one of the sub-regions 622a-d, 625a-d at a given time.

In the exemplary situation illustrated in FIGS. 6A-C, it is assumed that the respective storage allocations in the tile buffer 628 are first allocated for storing rendered fragment data for the respective sub-regions 622a-d for the first tile 602.

FIG. 6B illustrates this, and shows rendered fragment data 622a'-d' for each of sub-regions 622a-622d being stored in the tile buffer 628. In FIG. 6B, allocation 630 of the tile buffer 628 is allocated for rendered fragment data 622a' for sub-region 622a, allocation 631 is allocated for rendered fragment data 622d' for sub-region 622d, allocation 632 is allocated for rendered fragment data 622c' for sub-region 622c, and allocation 633 is allocated for rendered fragment data 622b' for sub-region 622b. Alternative allocations may be provided, e.g. depending on which sub-regions have fragments generated first.

In FIG. 6B, fragments 626 that have finished being processed to generate rendered fragment data that is stored in the tile buffer 628 are shown in solid black, whereas fragments still to be processed are shown in outline only.

In the example shown in FIG. 6B, for each of sub-regions 622a, 622b and 622d, there are still fragments to be processed. However, for sub-region 622c, the processing of all of the fragments that fall within that sub-region 622c has finished (since the one and only fragment in that sub-region has finished being processed). Accordingly, rendered fragment data 622c' for sub-region 622c may be written from the tile buffer 628 to memory while the rendered fragment data for sub-regions 622a, 622b, and 622d continues to be generated.

FIG. 6C shows rendered fragment data 622c' being written out of allocation 632 of the tile buffer 628. Allocation 632 of the tile buffer may now be allocated for storing rendered fragment data for another sub-region of a tile. This is illustrated in FIG. 6C by showing sub-region 624d of tile 606 being allocated the now free capacity in the tile buffer, such that rendered fragment data 624d' for sub-region 624d will now be stored in allocation 632 of the tile buffer 628.

As can be seen from the exemplary tile buffer capacity allocation sequence shown in FIG. 6A-C, in the embodiments of the technology described herein at least, the processing of a next tile may be begun without requiring the processing of a previous tile to have finished. In particular, capacity in the tile buffer for storing rendered fragment data for a sub-region of the tile can be, and is in an embodiment, allocated in a manner such that there can (when appropriate) be rendered fragment data for sub-regions of different tiles concurrently being stored in the tile buffer.

It can be seen from the above that the technology described herein, in its embodiments at least, can provide more efficient throughput of tiles through the tile buffer in tile-based graphics processing. This is achieved in the embodiments of the technology described herein at least, by tracking the processing of fragments for respective sub-regions of a tile, and controlling the writing of rendered fragment data from the tile buffer to memory for the respective sub-regions independently, and on the basis of the tracking of the processing of fragments for the sub-regions.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a tile-based graphics processor that comprises a tile buffer, and executes a graphics processing pipeline that includes a plurality of processing stages including a rasterisation stage and a rendering stage, to generate and store in the tile buffer rendered fragment data for a tile of a render output being rendered, the method comprising:
when rendering a tile of a render output, the tile corresponding to a region of a plurality of regions that the render output has been divided into for rendering purposes:
the rasterisation stage rasterising primitives to be processed for the tile to generate graphics fragments for rendering for the tile; and
the rendering stage rendering fragments for the tile generated by the rasterisation stage to generate rendered fragment data for the tile and storing the rendered fragment data for the tile in the tile buffer;
wherein the method further comprises the graphics processor:
determining which sub-regions, of a plurality of sub-regions that the tile has been divided into for fragment tracking purposes, fragments generated by the rasterisation stage fall within; and
for at least one sub-region of the plurality of sub-regions that the tile has been divided into:
determining when fragment processing for the sub-region of the tile has been finished by tracking the processing of fragments for the sub-region of the tile to determine when the processing of all fragments for the sub-region of the tile has been finished, wherein:
when the processing of all fragments for the sub-region of the tile has been finished but other fragments for the tile are still to finish processing, it is determined that fragment processing for the sub-region of the tile has been finished; and
controlling the writing of a set of rendered fragment data for the sub-region of the tile from the tile buffer to memory on the basis of the tracking of the processing of fragments for the sub-region of the tile.

2. The method of claim 1, wherein:
tracking the processing of fragments for the sub-region of the tile to determine when the processing of all fragments for the sub-region of the tile has been finished comprises:
determining when there are no more fragments that could fall within the sub-region of the tile that could be generated for the tile; and tracking the processing of fragments for the sub-region to determine when all of the generated fragments that have been determined to fall within the sub-region have finished being processed.

3. The method of claim 2, wherein determining when there are no more fragments that could fall within the sub-region that could be generated for the tile is based on whether there are any primitives remaining to be rasterised for the tile.

4. The method of claim 3, wherein determining that all of the generated fragments that have been determined to fall within a sub-region have finished being processed comprises tracking whether there are any fragments that have been determined to fall within the sub-region and that have not yet finished being processed.

5. The method of claim 1, wherein tracking the processing of fragments for the sub-region of the tile to determine when the processing of all fragments for the sub-region of the tile has been finished comprises:
    tracking whether fragments that have been determined to fall within the sub-region have finished their processing; and
    when there are no more fragments that may potentially fall within the sub-region to be generated, using the tracking of whether fragments that have been determined to fall within the sub-region have finished their processing to determine when the processing of all fragments determined to fall within the sub-region has finished.

6. The method of claim 5, wherein tracking whether fragments that have been determined to fall within the sub-region have finished their processing comprises:
    counting fragments as they are determined to fall within the sub-region; and
    counting fragments that have been determined to fall within the sub-region for which the processing has been finished.

7. The method of claim 1, wherein:
    controlling the writing of a set of rendered fragment data for the sub-region of the tile from the tile buffer to memory on the basis of the tracking of the processing of fragments for the sub-region of the tile comprises:
    writing a set of rendered fragment data for the sub-region of the tile from the tile buffer to memory in response to it being determined that the processing of all fragments for the sub-region of the tile has been finished.

8. The method of claim 1, comprising:
    allocating capacity in the tile buffer for storing rendered fragment data for a tile on a sub-region-by-sub-region basis.

9. The method of claim 1, comprising:
    controlling the processing of individual sub-regions of a tile in dependence upon whether capacity in the tile buffer has been allocated for storing rendered fragment data for the sub-regions.

10. The method of claim 1, comprising:
    allocating capacity in the tile buffer to a sub-region of a tile being rendered in response to the writing of rendered fragment data for a sub-region of a tile from the tile buffer to memory.

11. A tile-based graphics processor, comprising:
    a tile buffer operable to store rendered fragment data for a tile of a render output being rendered;
    a rasterisation circuit configured to rasterise primitives to be processed for a tile of a render output being generated to generate graphics fragments for rendering for the tile;
    a rendering circuit configured to render fragments generated by the rasterisation circuit to generate rendered fragment data for the tile, and store the rendered fragment data for a tile in the tile buffer;
    a write out circuit configured to write rendered fragment data from the tile buffer to memory;
    a fragment sub-region determining circuit configured to determine which sub-region, of a plurality of sub-regions that a tile being processed has been divided into for fragment tracking purposes, a fragment generated by the rasterisation circuit falls within; and
    a fragment tracking circuit configured to, for at least one sub-region of a plurality of sub-regions that a tile being processed has been divided into for fragment tracking purposes:
        track the processing of fragments for the sub-region of the tile to determine when the processing of all fragments for the sub-region of the tile has been finished, wherein the fragment tracking circuit is operable to determine that the processing of all fragments for the sub-region of the tile has been finished when there are other fragments for the tile that are still to finish processing; and
        control the writing of a set of rendered fragment data for the sub-region to memory by the write out circuit on the basis of the tracking of the processing of fragments for the sub-region of the tile.

12. The graphics processor of claim 11, wherein the fragment tracking circuit is configured to:
    determine when there are no more fragments that could fall within a sub-region of a tile that could be generated for the tile; and
    track the processing of fragments for a sub-region to determine when all of the generated fragments that have been determined to fall within the sub-region have finished being processed.

13. The graphics processor of claim 12, wherein the fragment tracking circuit is configured to:
    determine when there are no more fragments that could fall within a sub-region that could be generated for a tile based on whether there are any primitives remaining to be rasterised for the tile.

14. The graphics processor of claim 13, wherein the fragment tracking circuit is configured to:
    determine that all of the generated fragments that have been determined to fall within a sub-region have finished being processed by tracking whether there are any fragments that have been determined to fall within the sub-region and that have not yet finished being processed.

15. The graphics processor of claim 11, wherein the fragment tracking circuit is configured to:
    track the processing of fragments for a sub-region of a tile to determine when the processing of all fragments for the sub-region of the tile has been finished by:
    tracking whether fragments that have been determined to fall within the sub-region have finished their processing; and
    when there are no more fragments that may potentially fall within the sub-region to be generated, using the tracking of whether fragments that have been determined to fall within the sub-region have finished their processing to determine when the processing of all fragments determined to fall within the sub-region has finished.

16. The graphics processor of claim 14, wherein the fragment tracking circuit is configured to:

track whether fragments that have been determined to fall within a sub-region have finished their processing by:
counting fragments as they are determined to fall within the sub-region; and
counting fragments that have been determined to fall within the sub-region for which the processing has been finished.

17. The graphics processor of claim 11, wherein the fragment tracking circuit is configured to:
trigger the writing of a set of rendered fragment data for a sub-region of a tile from the tile buffer to memory in response to it being determined that the processing of all fragments for the sub-region of the tile has been finished.

18. The graphics processor of claim 11, comprising a tile buffer capacity allocation circuit configured to:
allocate capacity in the tile buffer for storing rendered fragment data for a tile on a sub-region-by-sub-region basis.

19. The graphics processor of claim 11, comprising a control circuit configured to:
control the processing of individual sub-regions of a tile in dependence upon whether capacity in the tile buffer has been allocated for storing rendered fragment data for the sub-regions.

20. The graphics processor of claim 11, comprising a tile buffer capacity allocation circuit configured to:
allocate capacity in the tile buffer to a sub-region of a tile being rendered in response to the writing of rendered fragment data for a sub-region of a tile from the tile buffer to memory.

21. A non-transitory computer readable storage medium storing computer software code which when executing on one or more processors performs a method of operating a tile-based graphics processor that comprises a tile buffer, and executes a graphics processing pipeline that includes a plurality of processing stages including a rasterisation stage and a rendering stage, to generate and store in the tile buffer rendered fragment data for a tile of a render output being rendered, the method comprising:
when rendering a tile of a render output, the tile corresponding to a region of a plurality of regions that the render output has been divided into for rendering purposes:
the rasterisation stage rasterising primitives to be processed for the tile to generate graphics fragments for rendering for the tile; and
the rendering stage rendering fragments for the tile generated by the rasterisation stage to generate rendered fragment data for the tile and storing the rendered fragment data for the tile in the tile buffer;
wherein the method further comprises the graphics processor:
determining which sub-regions, of a plurality of sub-regions that the tile has been divided into for fragment tracking purposes, fragments generated by the rasterisation stage fall within; and
for at least one sub-region of the plurality of sub-regions that the tile has been divided into:
determining when fragment processing for the sub-region of the tile has been finished by tracking the processing of fragments for the sub-region of the tile to determine when the processing of all fragments for the sub-region of the tile has been finished, wherein:
when the processing of all fragments for the sub-region of the tile has been finished but other fragments for the tile are still to finish processing, it is determined that fragment processing for the sub-region of the tile has been finished; and
controlling the writing of a set of rendered fragment data for the sub-region of the tile from the tile buffer to memory on the basis of the tracking of the processing of fragments for the sub-region of the tile.

* * * * *